Patented June 27, 1939

2,164,192

UNITED STATES PATENT OFFICE 2,164,192

METHOD OF MAKING PAPER FROM WHEAT, OAT, OR RYE STRAW

Arnold J. Marcham and Norris Reynolds, Carlyle, Ill., assignors of ten per cent to Ben O. Zillman, St. Louis, Mo.

No Drawing. Application June 23, 1933, Serial No. 677,270

2 Claims. (Cl. 92—13)

This invention relates to improvements in paper-making, and more particularly to the manufacture of strawboard from straws of various sorts, and has among its objects the production of such a method which will increase the yield of paper from a given amount of straw stock, which will require a smaller amount of chemicals for treatment of the stock, make a brighter and clearer paper than with the old methods, make stronger paper, which will require less time in such making, and all with a minimum amount of pollution of the water adjacent the paper manufactury.

The question of stream pollution has been an extremely important one in the manufacture of strawboard, and often results in a complete shut-down of the mill when the health authorities of the mill-towns are strict in enforcement, as quite a large amount of dirt and other foreign and waste matter are deposited in the stream in the course of regular production of a mill of this sort. Hence, the minimizing of this dumping of waste into the water, is of prime consideration, even though no other advantage was to be gained from this invention.

However, in addition to the accumulation of waste matter, the prior methods were slow, costly, and not productive of highest grade paper. My invention has sought to overcome these defects, and others and the advantages accruing from the use of this invention will be obvious to those skilled in the art to which this invention appertains, from the disclosures herein given.

Briefly, the method of making strawboard from cereal straws such as wheat, oats or rye, before the introduction of our process, was to put the straw stock into a rotary digester, wherein, with the required amount of suitable chemicals such as lime-soda, consisting substantially of burned lime and soda-ash, or other preferably alkali material, and in the presence of steam, cooking was had until the mass had become soft to the required degree. Then the mass was dumped into the beaters, or else into a stock pit, and from whence the desired quantities were drawn off from time to time and fed to the beaters, wherein the mass was beaten to the required fineness and impalpability and at the same time was washed or leached to remove the dirt and other foreign matter therefrom, and after concluding this treatment, the resultant mass was run through the paper-making machinery, such as the screens, etc.

The washing was necessary in order to remove not only what was thought to be dirt, but in addition the very darkly colored lignins and other tiny particles produced by the prior treatment of the straw stock with the necessarily large amounts of chemicals, and found unsuitable for running through the paper-making machines. Not only was valuable water-soluble content lost through such washing, but the quantity of such waste matter so produced was sufficiently great in many cases to cause pollution of the stream into which said waste was discharged, thereby creating a nuisance and compelling a complete shut-down of the plant for the time being. Further, the treatment of the stock with these chemicals in such large and excessive amounts darkened not only the waste materials, but darkened the finished paper itself, in addition to decreasing its strength.

In our process this washing, with its additional cost, both of water, time, and equipment, is obviated, and waste minimized to the utmost degree, as will be apparent from the description of our process which follows.

The straw stock is put into a digester, either stationary or rotary, and water or steam introduced and the mass soaked therein, steamed, or cooked, as desired, for about two hours or so, or until the outer leaf of the straw slips off, and at which time it will be found that the varnish, resin, etc., in the straw has been more or less extracted, and the water-soluble content has become dissolved.

After such pre-treatment in the aqueous manner aforesaid, the mass is treated with suitable chemicals such as lime, burned lime combined with soda-ash, etc., these alkalis of variety well-known in the art being added, and the mass is again treated in a digester, preferably with heat, and if so desired, starting out under a vacuum, until the required further softening of the stock is obtained. If so desired, the water-soluble content together with the aqueous solution used in its extraction, may be drawn off prior to the treatment with the chemical of the subsequent step, and then re-added after such chemical treatment has been concluded.

This pre-treatment by the water or steam has the characteristic and advantage of gently softening the straw and rendering the same more porous so that its subsequent treatment with the chemicals will permit of greatly increased rapidity of penetration into the straw by these chemicals, and with greater certainty. Further, this pre-treatment results in extracting the water-soluble materials in the straw before the addition of the alkali or other treating chemicals, so that such chemical will quickly and assuredly penetrate through the fibers of the stock, not only requiring less of this chemical to accomplish its purpose, with less time consumed in cooking with said chemical to soften the fibers, the pores of the straw stock being opened more fully for these purposes through the aqueous treatment, but what is of perhaps greater importance, there will result a saving of the finer and more delicate fibers of the straw without breaking them down and discoloring them so as to render them useless for paper-making and mere waste.

The preliminary treatment with water tends to dissolve the soluble lignins, slips the leaf from the stalk, and opens up the pores of the same so as to permit of rapid penetration of the straw with a lesser quantity of chemical, and whereby the chemical reaches the main stem or innermost fibers without injury to the leaf or the finer and more delicate fibers. Thus, these finer fibers are not destroyed or injured and rendered useless for making paper, before the balance of the straw has been softened sufficiently by the chemicals.

The entire resultant mass may then be placed in the beaters and from there run through the paper-making machinery, but it is to be particularly noted that the usual step of washing at this point has been now found unnecessary and is to be omitted in following our process. It has been found from actual production under our method as herein set forth, that the dirt and other waste which had to be removed under the old process, before running the material through the paper-making machinery, was really caused in the old process through over-treating with the chemicals. Our process is so gentle and gradual in its action that all of the fibers and the valuable constituents of the stock are made available for use without their destruction or injury, and the entire mass may be run through the paper-making machinery without loss.

Not only is there practically little loss, as compared with the old process which required washing, but there results a much brighter and clearer paper, and with better color and more strength. The materials and constituents formerly thrown away, and now used in our process, is of great benefit to the finished paper, and there is no problem of stream pollution. Further, the decrease in waste not only results in greater yield of paper from each ton of straw, but requires less machinery, lower power costs especially where beaters are used, lower costs for heating in cooking, a saving in the time required, and a saving in the quantity of chemicals needed for complete treatment.

It is to be especially pointed out at this time, that the aqueous solution that runs through the paper making machinery and that does not combine to form part of the sheet itself, need not be dumped into the stream and thereby pollute the latter in any degree, but upon the contrary, may be used over and over again in the same manner as fresh water in pre-treating the fresh successive batches of straw stock, just as if such water had not come from the screens, etc. Obviously, not only is the degree of stream pollution thus sharply minimized, but a saving in water costs and other costs is had, and in addition insuring that substantially all of the valuable constituents in said aqueous solution will be used at one run or another to form paper.

Having thus described our invention, it is obvious that various immaterial modifications may be made in the same without departing from the spirit of our invention; hence we do not wish to be understood as limiting ourselves to the exact process herein shown and described, except as limited by the state of the art to which this invention appertains, and the claims hereto appended.

What we claim as new and desire to secure by Letters Patent is:

1. The cyclic method of making strawboard, consisting in pre-treating one batch of straw with water or steam for a suitable period to dissolve the water-soluble constituents; suitably treating the resultant mass in the presence of chemicals and without removal of said aqueous solution, to further break down the same; passing the thus resultant mass through the paper-making machinery to form the paper sheet; and re-using the liquid thus drained from said paper-making machinery for pre-treatment of succeeding batches of straw.

2. A cyclic method of making paper, which comprises pre-softening a batch of straw with water or steam; cooking the resultant mass with alkali without removal of said liquid and without washing; passing the unwashed cooked mass through a paper-forming means and removing excess liquid therefrom; and re-using said last-mentioned liquid to pre-soften a successive batch of straw.

ARNOLD J. MARCHAM.
NORRIS REYNOLDS.